United States Patent [19]

Norlander

[11] 3,817,131
[45] June 18, 1974

[54] APPARATUS FOR CUTTING RINGS FROM TUBES

[75] Inventor: Lars Gosta Norlander, Partille, Sweden

[73] Assignee: SKF Industrial Trading and Development Company, B.V., Jutphaas, Netherlands

[22] Filed: Nov. 16, 1972

[21] Appl. No.: 307,084

[30] Foreign Application Priority Data
Jan. 16, 1971  Sweden............................ 14629/71

[52] U.S. Cl............................ 82/101, 82/46, 82/47, 82/59
[51] Int. Cl......... B23b 3/04, B23b 5/14, B23b 1/00
[58] Field of Search......... 82/46, 47, 48, 53.1, 70.1, 82/70.2, 81, 83, 89, 101, 102, 59

[56] References Cited
UNITED STATES PATENTS

| 763,558 | 6/1904 | Harthan | 82/89 |
|---|---|---|---|
| 861,597 | 7/1907 | Merritt | 82/46 X |
| 1,758,729 | 5/1930 | Wilson | 82/101 X |
| 2,670,576 | 3/1954 | Hockett | 82/102 X |
| 2,696,883 | 12/1954 | Broden | 82/48 |
| 3,043,174 | 7/1962 | Worrall, Jr. | 82/81 |
| 3,470,775 | 10/1969 | Marcovitch | 82/83 |
| 3,630,113 | 12/1971 | Ronai | 82/53.1 |

FOREIGN PATENTS OR APPLICATIONS

| 541,416 | 10/1955 | Belgium | 82/59 |

*Primary Examiner*—Harrison L. Hinson
*Attorney, Agent, or Firm*—Howson and Howson

[57] ABSTRACT

An apparatus for cutting rings from a tube comprises a mandrel for receiving the tube and a disc-shaped tool-holder carrying at its periphery a number of spaced cutting edges. The mandrel is rotated around its longitudinal axis at a constant rotational speed and makes one revolution while any one of the cutting edges is in cutting engagement with the tube. The tool holder is rotated around a predetermined axis at a lower constant rotational speed and simultaneously fed parallel to the tube at a constant linear velocity. The feed velocity and the rotational speed of the tool holder are adjusted to each other so as to permit the cutting edge in cutting engagement with the tube to move in a plane perpendicular to the tube axis.

3 Claims, 3 Drawing Figures

PATENTED JUN 18 1974  3,817,131

APPARATUS FOR CUTTING RINGS FROM TUBES

BACKGROUND OF THE INVENTION

Field of the Invention

The present invention relates to an apparatus for cutting rings from a tube, more particularly for cutting thin high-precision rings consecutively from one end of a tube of a resilient material, such as rubber.

SUMMARY

According to the present invention the apparatus comprises a rotatable mandrel for receiving the tube to be cut and a tool holder which is rotatable around a predetermined axis and carries a number of cutting edges equidistantly spaced from the predetermined axis. The predetermined axis extends parallel to a first plane enclosing the tube axis and forms an acute angle with a second plane enclosing the tube axis, said first and second planes being perpendicular to each other. The mandrel with the tube threaded thereon is rotated around its longitudinal axis at a constant rotational speed and makes one revolution while any one of the cutting edges is in cutting engagement with the tube. The tool holder is rotated around the predetermined axis at a lower constant rotational speed and simultaneously fed parallel to the tube at a constant linear velocity. The feed velocity and the rotational speed of the tool holder are adjusted to each other so as to permit the cutting edge in cutting engagement with the tube to move in a plane perpendicular to the tube axis.

DESCRIPTION OF THE PREFERRED EMBODIMENTS

Figure 1:
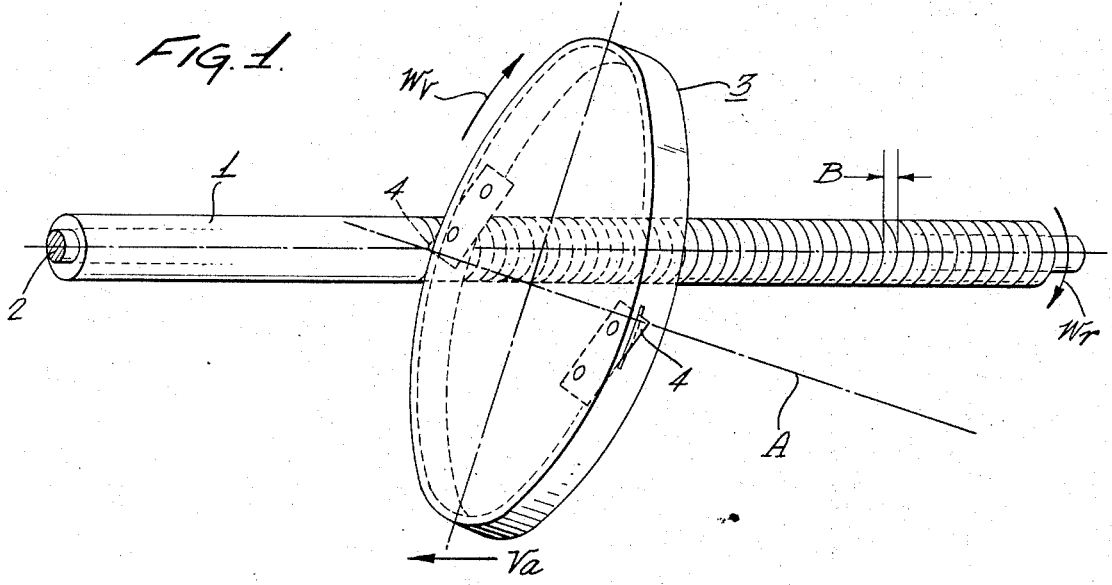
FIG. 1 is a schematic perspective view of the essential components of an apparatus according to the present invention.
Figure 2:
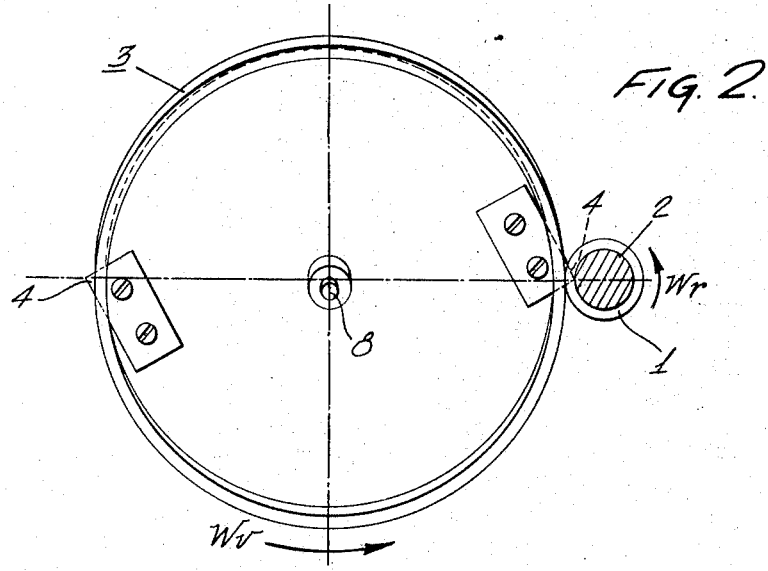
FIG. 2 is an end view of the apparatus of FIG. 1.

Referring to FIGS. 1 and 2 of the drawing, a tube 1, for example of rubber, from which rings are to be cut, is mounted on a mandrel 2 and brought into quick rotation in the direction of the arrow $\omega_r$.

A circular tool-holder 3 having a number of cutting edges 4 disposed around the periphery thereof rotates relatively slowly in the direction of arrow $\omega_v$ around a predetermined axis A and is simultaneously displaced parallel to the tube 1 with the velocity $V_a$, see the arrow in FIG. 1. Each cutting edge is in full cutting engagement with the tube, i.e. cuts through the tube wall, for so long a time interval during each revolution of the tool holder, that the tube rotates 360°, and the axis A has such an angle in relation to the tube axis that the direction of the motion of the cutting tools relative to the tube - during the time they are in engagement with the tube - is perpendicular to the tube axis. The cutting tools, illustrated as razor blades in FIG. 2, are secured to the tool holder in such a manner that the edges extend parallel to their direction of motion relative to the tube in the area where they are in engagement with the tube. During the engagement time interval of each cutting edge the tool holder rotates just a few degrees. The breadth B of the rings cut off depends on the rotational speed and the feed velocity of the tool holder 3 and on the number of cutting edges 4 around the tool holder. If the tool holder is supposed to have a constant rotational speed and the cutting edges are equidistantly spaced around the periphery of the tool holder the breadth of all the rings cut off is uniform. If the cutting edges are non-uniformly distributed around the periphery of the tool holder, rings having cyclically varying breadth are obtained.

Figure 3:
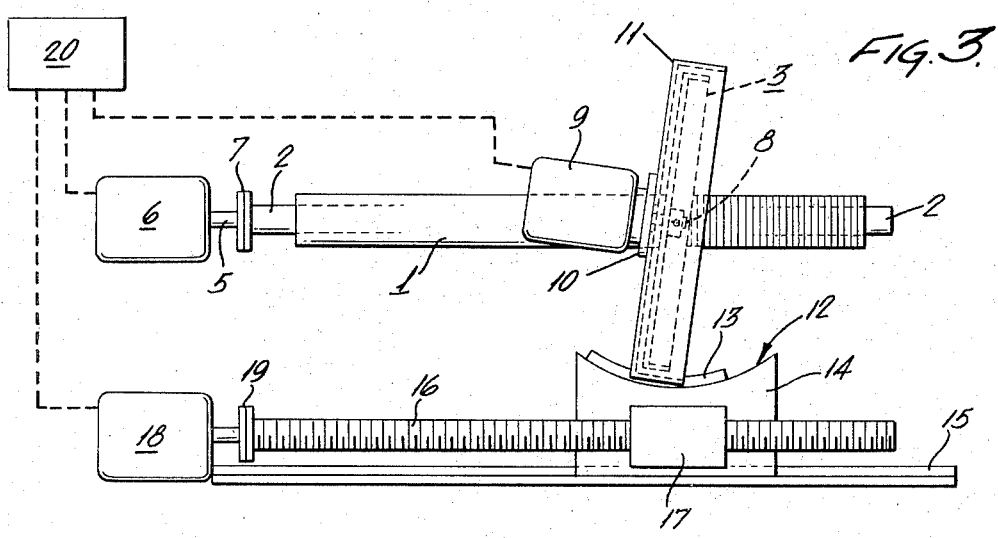
FIG. 3 is a schematic frontal view of the complete apparatus of the present invention.

The rotating movements and the feed movement can be produced in many different ways, for instance in a turning machine such as a lathe. However, FIG. 3 shows an apparatus which is self-contained with respect to motor drive. The driving shaft 5 of a first motor 6, preferably an electric motor, is connected to the mandrel 2 by means of a shaft coupling 7. The driving shaft 8 of a second motor 9, preferably a flange type electric motor, is connected direct to the tool holder 3. The flange 10 of the motor 9 is attached to a protective cover 11, such as a bonnet, for the tool-holder 3. The motor 9 and protective cover 11 assembly is supported by a base 12 comprising a top base member 13 and a bottom base member 14. The top member 13 is attached to the lower part of the protective cover 11 and has a cylindrically curved bottom surface, and the top surface of the bottom base member 14 has a matching cylindrical curvature. The axis of the cylinder is perpendicular to that of mandrel 2, and passes through a point where the axis of motor 9 enters a plane enclosing the revolving cutting edges. Means (not shown) are provided for securing the top base member 13 in any desired position with respect to the bottom base member 14. The bottom base member 14 is slidable on guide means 15 extending parallel to the mandrel 2 and is displaceable along the guide means by means of a screw 16 and nut 17 transmission. The nut 17 is attached to the bottom base member 14 and the transmission preferably is of the type having a plurality of rollers interposed between the screw member and the nut member and engaging the threads of both members. In the embodiment shown in FIG. 3 the screw is driven by an electric motor 18 connected to the screw by means of a shaft coupling 19. However, in some cases it is advantageous to drive screw 16 from motor 6 over a chain drive, preferably a variable-pitch sheave drive such as P.I.V. variable speed drive. A control unit 20 is provided for starting, stopping and controlling the speed of motors 6, 9 and 18.

When rings are to be cut off from resilient tubes the diameter of mandrel 2 suitably is somewhat larger than the bore diameter of the tube 1 when unmounted, preferably 2 to 10 per cent larger. Thereby the tube as well as the rings will be securely located or seated on the mandrel so that the rings will be produced with smooth even cuts and great dimensional accuracy. An apparatus according to the invention has been successfully used for cutting rings having a breadth of about 0.4 mm from a rubber tube having a wall thickness of about 1.5 mm.

While one specific embodiment of the invention has been described in detail above, it is to be understood that various modifications may be made from the specific details described without departing from the spirit and scope of the invention.

What is claimed is:

1. An apparatus for cutting rings from a tubular member comprising at least one tool element having a cutting edge movable into cutting engagement with said tubular member, a rotatable tool holder supporting said tool for rotation about a predetermined axis, said predetermined axis extending parallel to a first plane enclosing said tubular member axis and forming an acute angle with a second plane perpendicular to said first plane and enclosing said tubular member axis, said tool cutting edge during at least a portion of its orbit about said predetermined axis cutting through the wall of said tubular member, means for continuously rotating said tubular member about its longitudinal axis, means for rotating the tool holder at a lower rotational angular speed than said tubular member and in the same direction as that of the rotation of said tubular member, the relationship between said rotational speeds being such that while the tubular member is being rotated at least one revolution the tool holder is being rotated a fraction of a revolution and the tool edge is cutting through the wall of said tubular member, the tool edge upon said rotation of the tool holder revolving in a plane other than a radial plane and other than an axial plane through said tubular member, and means for moving the tool holder parallel to the axis of said tubular member during rotation of said tool holder and tubular member, the linear velocity of said tool holder when moving parallel to said tubular member being equal to the rotational speed of the tool holder multiplied by the desired axial thickness of the ring to be cut and further multiplied by the number of cutting edges in operation during one revolution of the tool holder, the resulting linear velocity of the cutting edges relative to the axis of said tubular member in the area of cutting engagement being perpendicular to the axis of said tubular member.

2. The apparatus of claim 1, wherein the means for rotating the tube comprises an elongate mandrel adapted to be inserted into the tube, the diameter of said mandrel exceeding the inner diameter of the tube, when in a non-mounted condition, by at least about 2 per cent and at most about 10 per cent.

3. The apparatus of claim 1, wherein the cutting edge when in cutting engagement with the tube is orientated in the radial plane of the tube.

* * * * *